June 18, 1968  F. E. WINNEN ET AL  3,388,917
HYDRAULIC CHUCKS AND ARBORS
Filed March 14, 1966
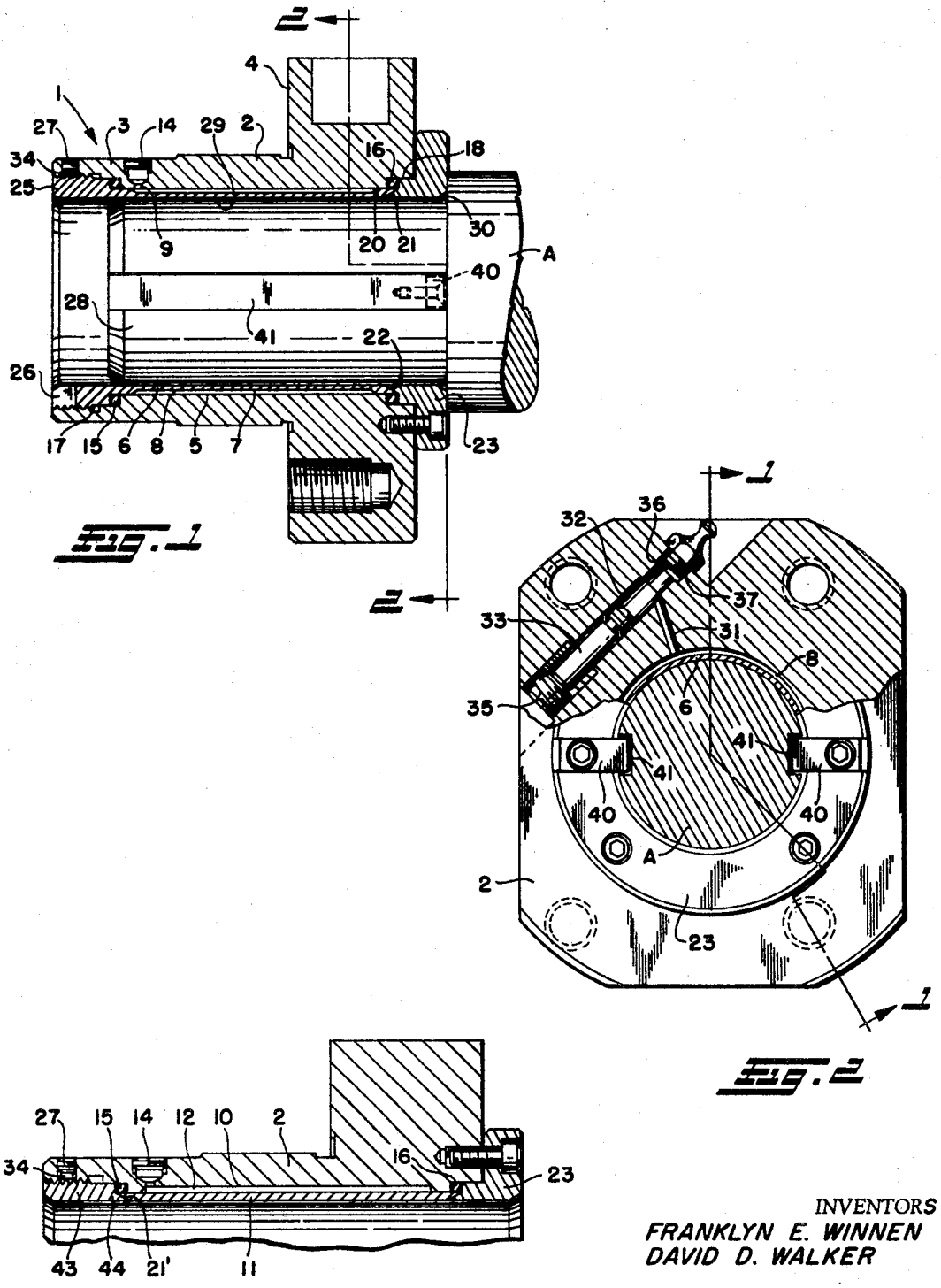
INVENTORS
FRANKLYN E. WINNEN
DAVID D. WALKER
BY Oberlin, Maky & Donnelly
ATTORNEYS United States Patent Office 3,388,917
Patented June 18, 1968

3,388,917
HYDRAULIC CHUCKS AND ARBORS
Franklyn E. Winnen, Cleveland, and David D. Walker, Chagrin Falls, Ohio, assignors to Erickson Tool Company, Solon, Ohio, a corporation of Ohio
Filed Mar. 14, 1966, Ser. No. 534,034
8 Claims. (Cl. 279—4)

The present invention relates generally, as indicated, to hydraulic chucks and arbors and, more particularly, to certain improvements in chucks and arbors especially of the type disclosed in our copending application Ser. No. 364,367, filed May 4, 1964 now Patent No. 3,250,542.

The various forms of chucking devices disclosed in such prior copending application are of the hydrostatic type in which pressure applied on oil or grease confined in an annular chamber in the device is effective to deform elastically a relatively thin sleeve into tight gripping engagement with a workpiece, tool or the like therewithin or therearound. The ends of the deformable sleeve are securely attached to the body of the device in such a manner as to permit the employment of conventional packing rings or the like for precluding leakage of the hydrostatic fluid contained within the annular chamber through the sleeve-body joints. In the preferred form shown, this is accomplished by providing at least one collar member secured to the body in radially and axially overlapped relation with one end of the sleeve axially adjacent the corresponding packing ring, whereby there is no perceptible deformation of the sleeve in the area of the packing ring or consequent leakage of hydraulic fluid therepast.

Ordinarily, very close tolerances between the lengths of the sleeve and body must be maintained if the required overlapped relation therebetween is to be achieved. However, it is a principal object of the present invention to provide a similar type chuck or arbor in which the ends of the sleeve and collar member may be overlapped as aforesaid despite wide tolerance variations in the lengths of such sleeve and body.

Another object is to provide such a hydrostatic chuck or holding device in which one end of the deformable sleeve is tapered for engagement with a similarly tapered lip on the collar member to preclude radial deformation of such one end, and there is a threaded connection between the other end of the deformable sleeve and the body of the chuck, whereby the location of the sleeve within the body may be adjusted to bring the tapered end of the sleeve into mating engagement with its associated lip regardless of tolerance variations in the length of the sleeve or body.

A further object is to provide such a hydrostatic chuck in which both ends of the deformable sleeve are tapered, and there is a collar member located at each end of the body with correspondingly tapered lips for engagement with the tapered ends of the sleeve to preclude radial deformation at such ends, one of such collar members being in threaded engagement with the chuck body for axially adjusting the position of the sleeve with respect to the other collar member to assure proper mating engagement therewith despite tolerance variations in the length of the sleeve or body.

A still further object is to provide such a hydrostatic chuck with radially inwardly extending keys on the chuck body for locking the workpiece against turning within the chuck.

Other objects and advantages of the present invention will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In such annexed drawing:

FIG. 1 is a longitudinal cross-section view of a preferred form of hydrostatic chuck in accordance with this invention taken substantially along the line 1—1 of FIG. 2;

FIG. 2 is a transverse cross-section view of the chuck of FIG. 1 taken substantially along the line 2—2 thereof; and FIG. 3 is a fragmentary radial cross-section view showing a modified form of sleeve mounting.

Turning now to the details of the drawing and first of all to FIGS. 1 and 2, a preferred form of hydrostatic chuck illustrated by way of example is generally indicated at 1 and includes a body 2 provided with a pilot 3 and mounting flange 4 for securing the same to the spindle of a metal-working machine or machine tool, not shown. The body 2 has a longitudinal bore 5 therethrough for receipt of a thin metal sleeve 6 therewithin.

As shown, the sleeve 6 has a long peripheral groove 7 formed in the outer surface thereof between its ends which defines with the body 2 an annular chamber 8 adapted to be filled with oil or grease or equivalent hydrostatic fluid as through a passage 9 leading to such chamber upon removing the plug 14. Alternatively, the body 2 may be undercut at 10 to form with a sleeve 11 of uniform outside diameter the fluid chamber 12 as in the FIG. 3 embodiment, but this requires a more expensive machining operation.

Referring further to FIG. 1, the body 2 is counterbored at each end for receipt therein of O-rings 15 and 16 or like packing rings of rubber-like material preferably coated with Teflon, and the sleeve 6 extends through substantially the entire length of the bore 5 or at least beyond the O-rings 15 and 16 in the counterbores 17 and 18 for sealing engagement therewith.

One of the sleeve ends 20 may have an internal bevel or countersink 21 for mating engagement with a correspondingly tapered or frusto-conical lip 22 on a collar member 23 bolted or otherwise secured in the counterbore 18. The other end 25 of the sleeve 6 is radially thickened and externally threaded for engagement with the internally threaded counterbore 17. This threaded connection between the sleeve 6 and body 2 permits axial adjustment of the sleeve 6 therewithin as by turning the sleeve with a spanner wrench or like tool inserted in the end slots 26 in such sleeve for automatic takeup of any tolerance variations that there might be in the length of the sleeve as compared to the length of the bore 5, thereby assuring proper engagement of the tapered end 20 and lip 22. A set screw 27 and brass plug 34 or the like may be provided for locking the sleeve 6 in any desired adjusted position. Accordingly, when fluid pressure is supplied to the annular chamber 8 to cause radial inward deformation of the sleeve 6, even without an article A therewithin there is no deformation thereof adjacent the O-rings 15 and 16 and thus no leakage of the hydrostatic fluid between the body 1 and sleeve 6 joints. Of course, when the shaft 28 of the article A which has a close fit in the sleeve bore 29 and is of substantial length to extend throughout substantially the entire length of the sleeve 6 is inserted into the sleeve, it will be firmly, uniformly, and stably gripped thereby throughout the relatively great axial length between the O-rings 15 and 16. To facilitate insertion of the article A in the sleeve 6, the entrance end of the collar member 23 may be slightly tapered as at 30.

For supplying hydrostatic fluid pressure to the annular chamber 8, the body 2 has another passage 31 which leads from the annular chamber 8 to a transverse passage 32 in the flange 4 with a plunger 33 axially slidably received in such transverse passage. One end of the transverse passage 32 is internally threaded to receive a socket head screw 35, which, when turned, bears on the outer end of the plunger 33 to cause the plunger to move inwardly, thereby forcing the hydrostatic fluid through the passage 31 to the annular chamber 8 to effect deformation of the sleeve 6 as aforesaid. To assist in filling the chuck 1 with hydrostatic fluid the other end of the transverse passage 32 may be provided with a seat 36 for engagement by a removeable plug 37. Thus, with the plunger 33 and screw 35 in fully retracted position and the plug 37 removed, the chuck 1 may be filled through the passage 9. Any excess fluid beyond the seat 36 will be displaced through the filling passage 9 during tightening of the plug 37 into engagement with the seat 36 with the plug 14 loosely inserted to permit leakage. Thereafter, the plug 14 is fully tightened to seal the fluid within the chuck.

When it is desired to release the article A, the socket head screw 35 is loosened to permit outward movement of the plunger 33, whereupon the sleeve 6 springs back to its original inside diameter and forces the hydrostatic fluid back into the transverse passage 32 where it displaces the plunger 33.

In addition to the deformable sleeve 6 for gripping the article A, there may also be provided suitable means for positively locking the workpiece against turning in the chuck 1, such as a plurality of radially inwardly extending keys 40 mounted adjacent one of the ends of the body 2 for receipt in axial splines or slots 41 in the workpiece.

Although it is preferred that the enlarged threaded portion 25 be integral with the sleeve 6, it should be understood that such enlarged portion could be a separate collar 43 as in the FIG. 3 embodiment and provided with a tapered lip 44 for engagement with a correspondingly tapered mouth 21' on the sleeve 11. Moreover, while the pressure on the grease or oil radially contracts the thin-walled sleeve 6 and 11, it is apparent that the sleeves may be arranged reversely for radial expansion by such fluid pressure.

From the above discussion, it can now be seen that the various forms of hydrostatic chucks of the present invention are of a unique construction which permit overlapping engagement between the deformable sleeve and a collar member to preclude leakage of the hydrostatic fluid through the points therebetween despite tolerance variations in the length of the sleeve and body of the chuck.

Other modes of applying the principles of the invention may be employed, change being made as regards the details described, provided the features stated in any of the following claims or the equivalent of such be employed.

We therefore, particularly point out and distinctly claim as our invention:

1. A hydrostatic chuck comprising a chuck body and a metal workpiece-gripping sleeve telescopically interfitting one within the other and defining therebetween a chamber of substantial axial length adapted to be filled with a non-compressible fluid; packing rings radially squeezed between said body and sleeve adjacent the ends of said chamber effective to seal the body-sleeve joints thereat; said body having a passage leading to said chamber; said sleeve between said packing rings being relatively thin so as to be radially deformed to grip a workpiece upon supplying fluid pressure to said chamber; and a collar member secured to said body in radially and axially overlapped relation with one end of said sleeve axially adjacent the corresponding packing ring for maintaining said one end in engagement with said chuck body thus to preclude radial deformation of said sleeve thereat; said sleeve at its other end axially adjacent the other packing ring having an integral radially thickened portion threadedly engaging said body, whereby said sleeve may be axially adjusted with respect to said body for automatic takeup of any tolerance variations to position said collar member and said one end of said sleeve in such radially and axially overlapped relation as aforesaid.

2. The hydrostatic chuck of claim 1 further comprising radially extending keys mounted on said body for locking a workpiece gripped by said sleeve against turning.

3. The hydrostatic chuck of claim 1 wherein said sleeve has an internally beveled end portion axially adjacent the corresponding packing ring; and said collar member has an externally beveled lip in mating engagement within the internally beveled end of said sleeve thus to preclude radial deformation of said sleeve thereat.

4. A hydrostatic chuck comprising a chuck body and a metal workpiece-gripping sleeve telescopically interfitting one within the other and defining therebetween a chamber of substantial axial length adapted to be filled with a non-compressible fluid; packing rings radially squeezed between said body and sleeve adjacent the ends of said chamber effective to seal the body-sleeve joints thereat; said body having a passage leading to said chamber; said sleeve between said packings being relatively thin so as to be radially deformed to grip a workpiece upon supplying fluid pressure to said chamber; and two collar members secured to said body adjacent the ends of said sleeve; each collar member having an externally beveled lip in engagement with the adjacent internally beveled ends of said sleeve thus to preclude radial deformation of said sleeve thereat; one of said collar members threadedly engaging said body, whereby said sleeve may be axially advanced toward the other collar member upon tightening of said one collar member to assure proper mating engagement of said beveled ends and beveled lips regardless of tolerance variations in the length of said sleeve and body.

5. A hydrostatic chuck comprising a chuck body, a metal workpiece-gripping sleeve telescopically interfitting inside said chuck body and defining with the latter a chamber of substantial axial length adapted to be filled with a non-compressible fluid; packing rings radially squeezed between said body and sleeve effective to seal the body-sleeve joints adjacent the ends of said chamber; said body having a passage leading to such chamber; said sleeve between said packing rings being relatively thin and of uniform radial wall thickness so as to be radially contracted to grip a workpiece therewithin upon supplying fluid pressure to said chamber; a first collar member secured to said body in radially and axially overlapped relation with one end of said sleeve axially adjacent the corresponding packing ring for maintaining said one end in engagement with said body thus to preclude radial deformation of said sleeve thereat; and a second collar member threadedly engaging a counterbore in said body adjacent the other end of said sleeve for axially adjusting the position of said one end of said sleeve with respect to said first collar member as aforesaid.

6. The hydrostatic chuck of claim 5 wherein said second collar member is a radial enlargement on said other end of said sleeve, and the associated O-ring is disposed in said counterbore between said radial enlargement and body.

7. The hydrostatic chuck of claim 6 further comprising radially inwardly extending keys mounted on one end of said body for engagement in a longitudinal key way in a workpiece gripped by said sleeve to lock said workpiece against turning.

8. The hydrostatic chuck of claim 5 wherein said other end of said sleeve is internally beveled axially adjacent the corresponding packing ring; and said second collar member has an externally beveled lip in mating engagement within said other beveled end thus to preclude radial deformation of said sleeve thereat.

References Cited
UNITED STATES PATENTS

| | | | |
|---|---|---|---|
| 2,744,756 | 5/1956 | Atherholt | 82—44 X |
| 2,772,100 | 11/1956 | Kreissig | 285—351 X |
| 3,034,408 | 5/1962 | Kampmeier | 279—4 X |
| 3,079,789 | 3/1963 | Dean | 279—4 X |

ROBERT C. RIORDON, *Primary Examiner.*

J. F. McKEOWN, *Assistant Examiner.*